(12) United States Patent
Ynclino, V et al.

(10) Patent No.: US 11,270,090 B2
(45) Date of Patent: Mar. 8, 2022

(54) VARIABLE DEPTH OF FIELD SCANNING AND LIGHTING DEVICES AND METHODS

(71) Applicant: NCR Corporation, Atlanta, GA (US)

(72) Inventors: Eugene Semblante Ynclino, V, Cebu (PH); Ferdinand Uy Calderon, Cebu (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/714,984

(22) Filed: Dec. 16, 2019

(65) Prior Publication Data
US 2020/0117867 A1 Apr. 16, 2020

Related U.S. Application Data

(62) Division of application No. 15/339,042, filed on Oct. 31, 2016, now Pat. No. 10,515,245.

(51) Int. Cl.
*G06K 7/10* (2006.01)
*G07G 1/00* (2006.01)
*G06Q 20/20* (2012.01)

(52) U.S. Cl.
CPC ...... *G06K 7/10811* (2013.01); *G06K 7/10831* (2013.01); *G06Q 20/20* (2013.01); *G07G 1/0045* (2013.01)

(58) Field of Classification Search
CPC .................................................. G06K 7/10811
USPC ..................................................... 235/462.24
See application file for complete search history.

(56) References Cited

U.S. PATENT DOCUMENTS

| | | | | |
|---|---|---|---|---|
| 6,119,942 A | * | 9/2000 | Pierenkemper | G01J 1/4257 235/462.22 |
| 2002/0038820 A1 | * | 4/2002 | Check | G02B 26/10 235/462.14 |
| 2005/0218231 A1 | * | 10/2005 | Massieu | G02B 3/14 235/472.01 |
| 2008/0245872 A1 | | 10/2008 | Good | |

* cited by examiner

*Primary Examiner* — Rafferty D Kelly
(74) *Attorney, Agent, or Firm* — Schwegman, Lundberg & Woessner

(57) ABSTRACT

Various embodiments herein each include at least one of systems, methods, devices, barcode scanners, and software for variable depth of field scanning and lighting devices and methods. One such embodiment includes adjusting variable lenses on each of a plurality of barcode scanner scan-field lighting elements to a first depth of field and capturing a number of first images with a camera of a barcode scanner at the first depth of field. The method of this embodiment then outputs at least one of the number of the first images to a barcode reading process. This example method may then continue by adjusting the variable lenses of each of the plurality of barcode scanner scan-field lighting elements to a second depth of field, capturing a number of second images with the camera of the barcode scanner at the second depth of field, and then outputting at least one of the number of the second images to the barcode reading process. The adjusting, capturing, and outputting may then be repeated again in some embodiments for a third depth of field, a fourth depth of field, and onward, depending on the number of depths of field in a particular embodiment.

6 Claims, 7 Drawing Sheets

VARIABLE DEPTH OF FIELD SCANNING AND LIGHTING DEVICES AND METHODS

BACKGROUND INFORMATION

Barcode scanners are commonly at point of sale (POS) terminals to scan barcodes of products to be purchased. Barcode scanners are also deployed for other purposes, such as at kiosks to scan products for price checking, transportation check-in and boarding kiosks and terminals, and the like. Quickness and accuracy of scanning are often important barcode scanner characteristics. Factors that affect the speed and accuracy of barcode scanners include illumination of a scan field, clarity of an image, and distance of an item presented for scanning from the scanner. Current barcode scanners have fixed camera lenses for only a single depth of field and lighting, which may sometimes be altered in brightness, cannot be altered in distance it is focused.

SUMMARY

Various embodiments herein each include at least one of systems, methods, devices, barcode scanners, and software for variable depth of field scanning and lighting devices and methods. One such embodiment includes adjusting variable lenses on each of a plurality of barcode scanner scan-field lighting elements to a first depth of field and capturing a number of first images with a camera of a barcode scanner at the first depth of field. The method of this embodiment then outputs at least one of the number of the first images to a barcode reading process. This example method may then continue by adjusting the variable lenses of each of the plurality of barcode scanner scan-field lighting elements to a second depth of field, capturing a number of second images with the camera of the barcode scanner at the second depth of field, and then outputting at least one of the number of the second images to the barcode reading process. The adjusting, capturing, and outputting may then be repeated again in some embodiments for a third depth of field, a fourth depth of field, and onward, depending on the number of depths of field in a particular embodiment. Further, the adjusting may include not only the lighting arrays to illuminate at a particular depth of field, but also a lens on the camera to that same depth of field in a synchronous manner.

Another method embodiment includes determining a distance from a known point to an item presented for scanning by a barcode scanner and adjusting variable lenses on each of a plurality of barcode scanner scan-field lighting elements based on the determined distance. A lens on a camera may also be adjusted in some embodiments to enable the camera to capture images at the same depth of field.

A further embodiment is in the form of a barcode scanner. The barcode scanner includes at least one camera and at least one scan field light array. Each scan field light array is arranged to illuminate a scan field of one of the cameras of the at least one camera, the lighting elements of each scan field light array including variable lenses that focus light of the lighting elements at variable depths of field. The barcode scanner further includes a processor, a memory device, and a barcode reading process stored in the memory that is executable by the processor. Additional instructions are stored on the memory device and are executable by the processor to independently perform data processing activities with regard to each of the scan field lighting arrays. The data processing activities in some embodiments include adjusting the variable lenses on each lighting element of at least one scan field lighting array to a first depth of field, capturing a number of first images with at least one camera at the first depth of field, and outputting at least one of the first images to the barcode reading process. The adjusting, capturing, and outputting may then be repeated a number of time equal to a number of depth of field to be considered in scanning according to the specifics of a particular embodiment. The data processing activities may then be restarted.

DETAILED DESCRIPTION

Figure 1:
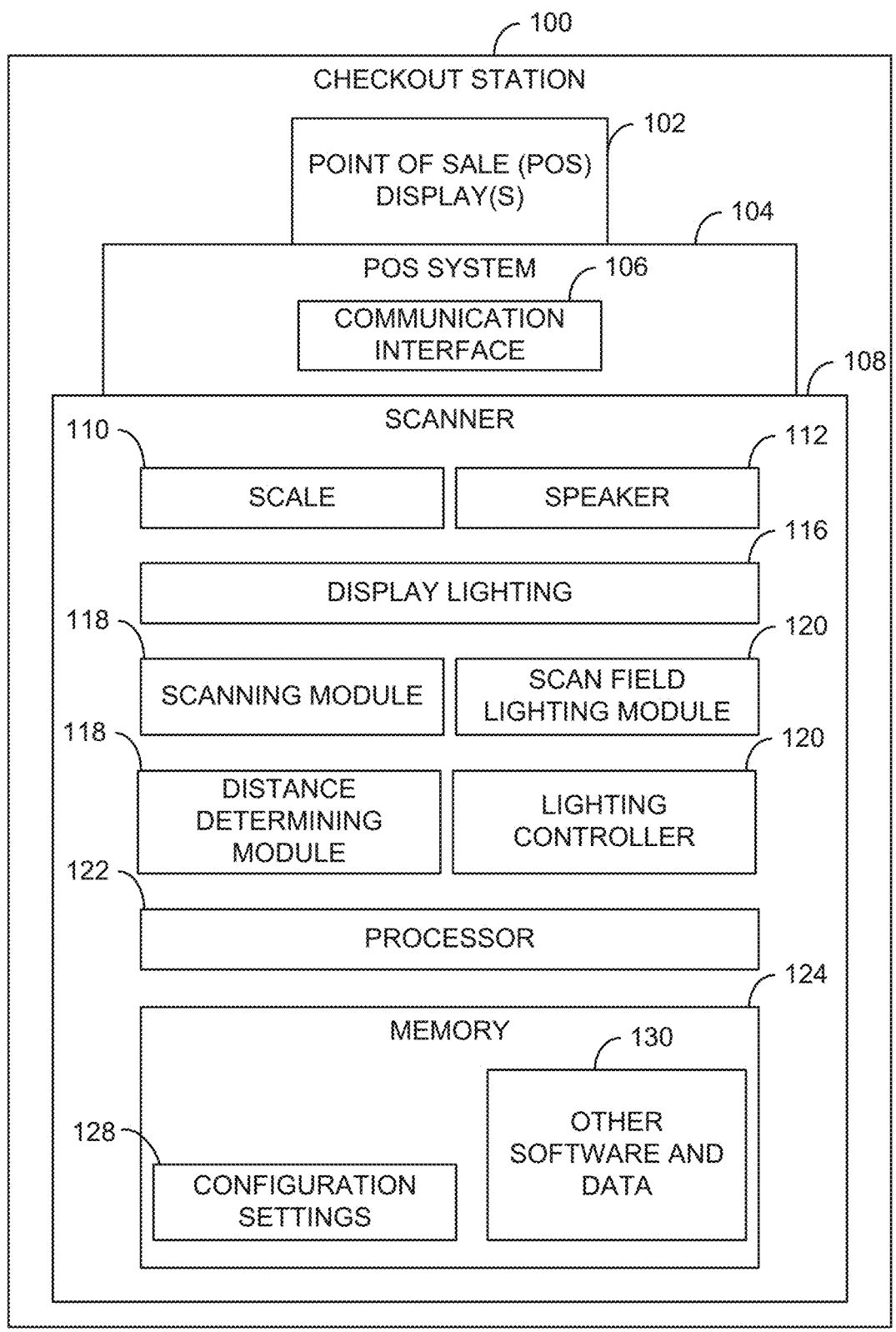
FIG. 1 is a diagram illustrating components of a checkout station having a scanner, according to an example embodiment.

Various embodiments herein each include at least one of systems, methods, devices, barcode scanners, and software for variable depth of field scanning and lighting devices and methods. These embodiments generally increase the overall performance of barcode imaging scanners by synchronizing camera lens depth of field and illumination intensity. This can be achieved in some embodiments by using variable lens technology, such as a liquid lens available from Varioptic of Lyon, France. Some embodiments use one or more distance sensors while other embodiments may use preset distances the focus of the camera depth of field (DOF) and focused intensity of the illumination that change simultaneously to achieve illumination synchronized with camera DOF.

One such preset distance embodiment s in the form of a method. In this method the DOF and Illumination change at preset distances from scanning elements of a scanner, such as a 7879 bioptic scanner available from NCR Corporation of Duluth, Ga. Three preset distances may be utilized and referred to as Near, Mid, and Far. The DOF will change as the frames on the camera changes. The change in DOF together with the Illumination is synchronized in such embodiments with the frames rate of the camera. For example, each second, 30 frames can be captured by some cameras. In such embodiments having a 30 frames per second capture rate, 10/30 frames may be dedicated to the near DOF and illumination, 10/30 frames may be dedicated to Mid DOF and illumination, 10/30 frames may be dedicated for Far. The sequence of change in DOF and illumination is generally constant. 1000 millisecond=1 second, 1000 milliseconds/30 (frame per second), the frame will change at 33.33 seconds. On the first and second frames in such embodiments, the DOF may be set for the near DOF and illumination, on the third and fourth frame the DOF may be set for the Mid DOF and illumination, on the fifth and sixth frame the DOF may be set for the Far DOF and illumination. The cycle will continue until one-second is reached which has 30 frames. The change in DOF and illumination are controlled, in some embodiments, by a change in voltage to the lens which enables the lens to change in shape or arrangement thus resulting in different DOF and illumination.

Another method embodiment utilizes a distance sensor or determination process based on image processing of images captured from different angles with regard to an item presented for scanning. In some such embodiments, the change in DOF and illumination relies on a distance sensor (acoustic/sonar, camera, or any other sensor) to determine the position of the object presented for scanning. The use of distance sensor may dictate the change in DOF and illumination. In this method the frame rate is not compromised since it will be fixed at 30 fps. The DOF and illumination in such embodiments automatically adjust as the items are place anywhere on the scan zone.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a stand-alone element or an element of other systems, devices, and terminals in other embodiments. Examples of other terminal-types that may include a scanner 108 are self-service terminals (SSTs), clerk operated and self-service library checkout stations, time-keeping terminals, and the like.

The methods of some embodiments are programmed as executable instructions in memory and/or non-transitory computer-readable storage media and executed on one or more processors associated with the components and devices herein. Some such components may be firmware.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a barcode scanner as that is the task most commonly associated with such devices. During operation of the checkout station 100, items are placed within a scan field of the scanner 108. One or more scanning modules 118 of the scanner 108, such as a camera, which may include a variable lens in some embodiments, a laser scanner, or both, then scan a barcode of an item presented for scanning and information read therefrom is communicated to the POS system 104. The POS system 104 then uses that data to identify the item presented within the scan field and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. In addition to the scanning module 118, the scanner 108 may include various other components. The various other components may include an integrated scale 110 such as may be used in a grocery outlet to weigh produce and one or both of a speaker 112 and display lighting 116 to output audio and visual signals such as signals of (un)successful scans. The scanner 108 may also include one or more scan field lighting modules 120 that may be turned on and off and adjusted based on a detected presence of an item to be scanned, a distance from a scanning surface of an item presented for scanning. In some embodiments, lighting elements of the scan field lighting modules 120 may include variable lenses to focus light at certain depths of field based on a programmatic cycle through specific depths, measured or approximated distances from a camera to an item presented for scanning within a scan field, and the like.

In some embodiments, the scanner 108 includes a distance determining module 119 and a lighting controller 121. As illustrated, the distance determining module. 119 and the lighting controller 121 are illustrated as hardware devices, such as firmware, ASICs, and the like. However, in other embodiments, one or both of the distance determining module 119 and the lighting controller 121 may be present in software 130 stored in the memory and be executed by the processor 122.

The distance determining module 119 determines a distance between a scanning surface and an item presented for scanning. In some embodiments, the distance determining module includes an ultrasonic distance measuring device as are commonly available as integrated circuits. In some embodiments where the scanner 108 is a bi-optic scanner, there may be two distance determining modules 119, present on or in proximity to each of the two scanning surface. The distance determining module 119 determines the distance in such embodiments and provides the distance to the lighting controller 121.

In other embodiments, the distance determining module 119 may determine a distance between a scanning surface and an item presented for scanning based on where a surface of an item presented for scanning appears in an image received from the scanning module 118 with regard to one or more known distances within a field of view of a camera of the scanning module 118. For example, when the scanner 108 is a bi-optic scanner, the scanner 108 typically includes two scanning surfaces that are approximately perpendicular to one another one scanning surface oriented vertically and the other horizontally. An image captured by a scanning module 118 of the horizontal scanning surface is processed in such embodiments to determine a distance of a surface of an item presented for scanning that is sufficiently parallel to the vertical scanning surface to be scanned by the scanning module 118 of the vertical scanning surface. An edge of the surface of the item presented for scanning by the vertical scanning surface may be detected by the image processing and a location of the edge is determined with regard to one or more known distance locations within the field of view of the scanning module 118 camera of the horizontal scanning surface. A similar process is also performed by the distance determining module 119 with regard to determining a distance between the item presented for scanning and a horizontal scanning surface except for the image processing is performed with regard to an image captured by a scanning module 118 camera of the vertical scanning surface.

In some embodiments, a bi-optic scanner may include two distance determining modules 119—one for each scanning surface. In other embodiments, a single distance determining module 119 may be shared between the two scanning surfaces.

Figure 2:
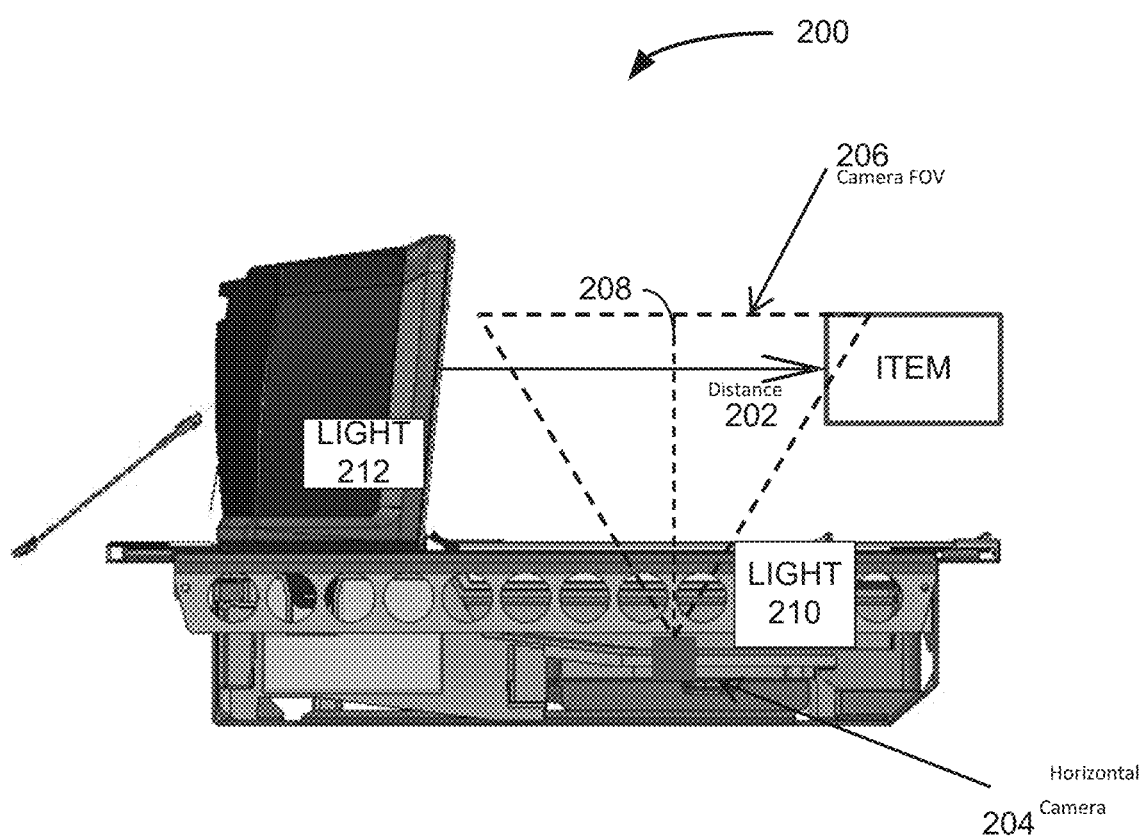
FIG. 2 is a scanner diagram, according to fin example embodiment.

FIG. 2 is a scanner 200 diagram, according to an example embodiment. The illustrated scanner 200 is a an example of a bi-optic scanner on which image processing based distance determination is performed by a distance determining module, such as the distance determining module 119 discussed above with regard to FIG. 1. The scanner 200 is illustrated with regard to performing image processing based distance determination to determine a distance between a vertical scanning surface and a surface of an item presented for scanning based on an image captured by a camera 202 from the direction of the horizontal scanning surface. However, the same processing can be performed to determine a distance between the horizontal scanning surface and a surface of the item presented for scanning, although the image would be capture from a direction of the vertical scanning surface.

An image captured by the horizontal camera 204 of a field of view 206. The camera 204 field of view 206 includes a known reference point 208. The distance may be measured distance that may be used identify a lighting setting for one or more of the lights 210, 212. However, in some embodiments, the distance between the scanning surface and the item presented for scanning is determined as whether it is less or greater than the known reference point 208. As illustrated in FIG. 2, the item is greater than the known reference point 208. This information may then be used to identify a lighting setting, or be transmitted to another module to make the determination. Some embodiments may include more than one known reference point 208. In some further embodiments, a known reference point is a distance threshold range which may indicate each of two or more lights or lighting arrays are to be illuminated.

Figure 3:
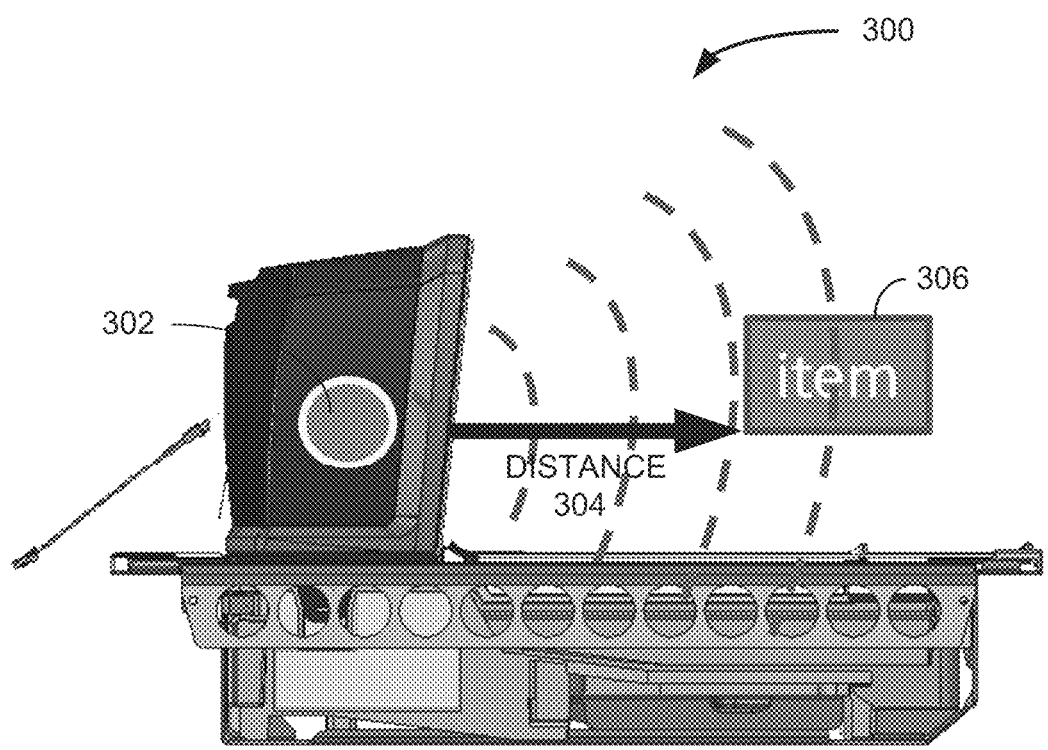
FIG. 3 is a scanner diagram, according to an example embodiment.

FIG. 3 is a scanner 300 diagram, according to an example embodiment. The scanner 300 is provided for purposes of illustrating an embodiment including an ultrasonic distance measuring device 302. Although the scanner 300 is illustrated as being a bi-optic scanner, the scanner 300 may instead have only a single scanning surface. The illustrated hi-optic scanner 300 includes only one ultrasonic distance measuring device 302. However, some embodiments may include an ultrasonic distance measuring device 302 on each of the scanning surfaces.

The ultrasonic distance measuring device 302 measures a distance between a scanning surface and the item 306 presented for scanning. The measured distance may then be provided to a lighting controller to set and adjust scan field lighting.

Figure 4:
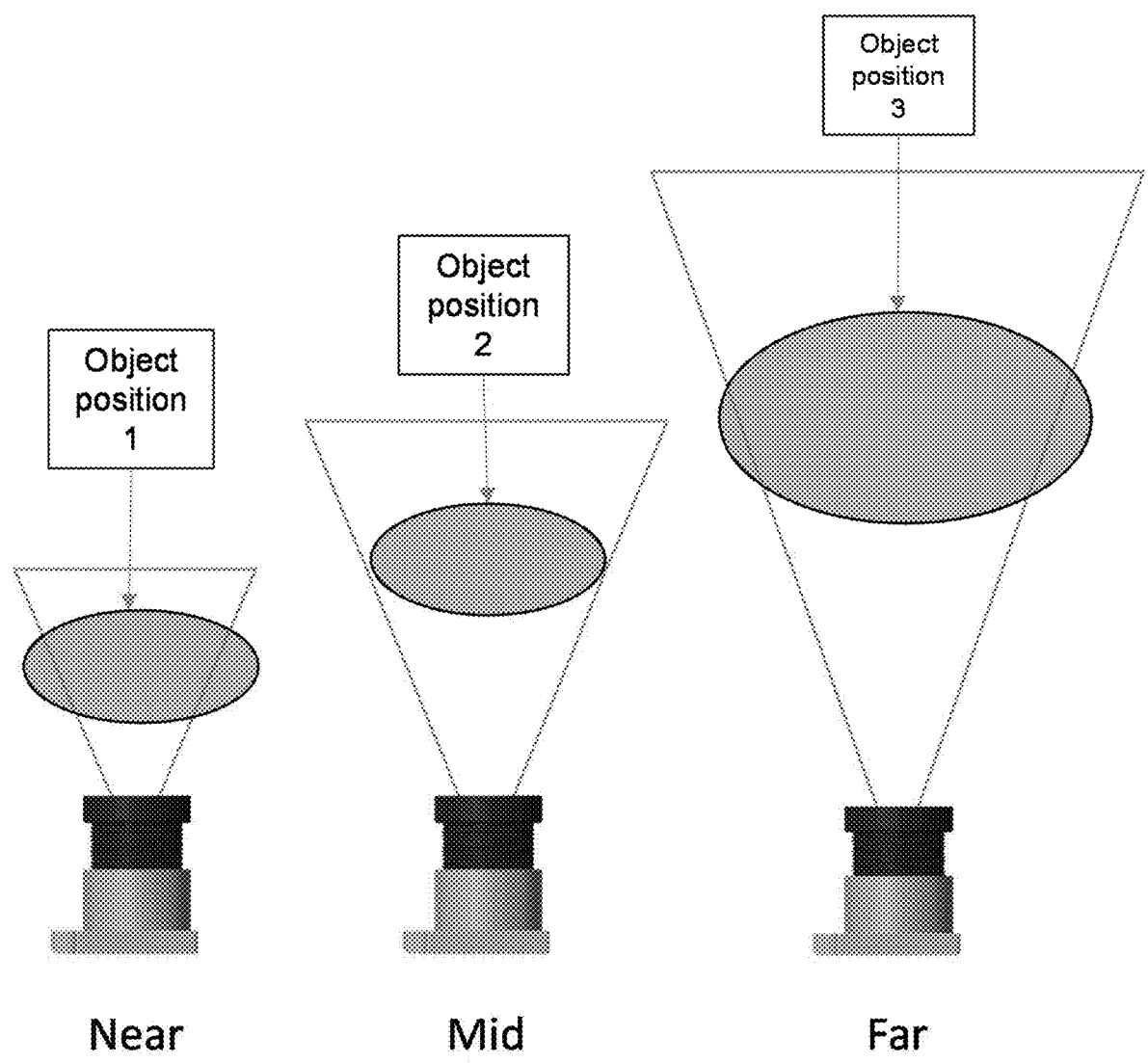
FIG. 4 illustrates three depths of field from a camera, according to an example embodiment.

FIG. 4 illustrates three depths of field from a camera, according to an example embodiment. The three illustrations include presentment of objects at positions 1, 2, and 3. Each object is illustrated at a different distance from a camera. The cone coming from each illustrated camera indicates the field of view and the dark oval represents a location distance where each respective object should be placed for scanning at a proper depth of field for a given setting or measurement.

Figure 5:
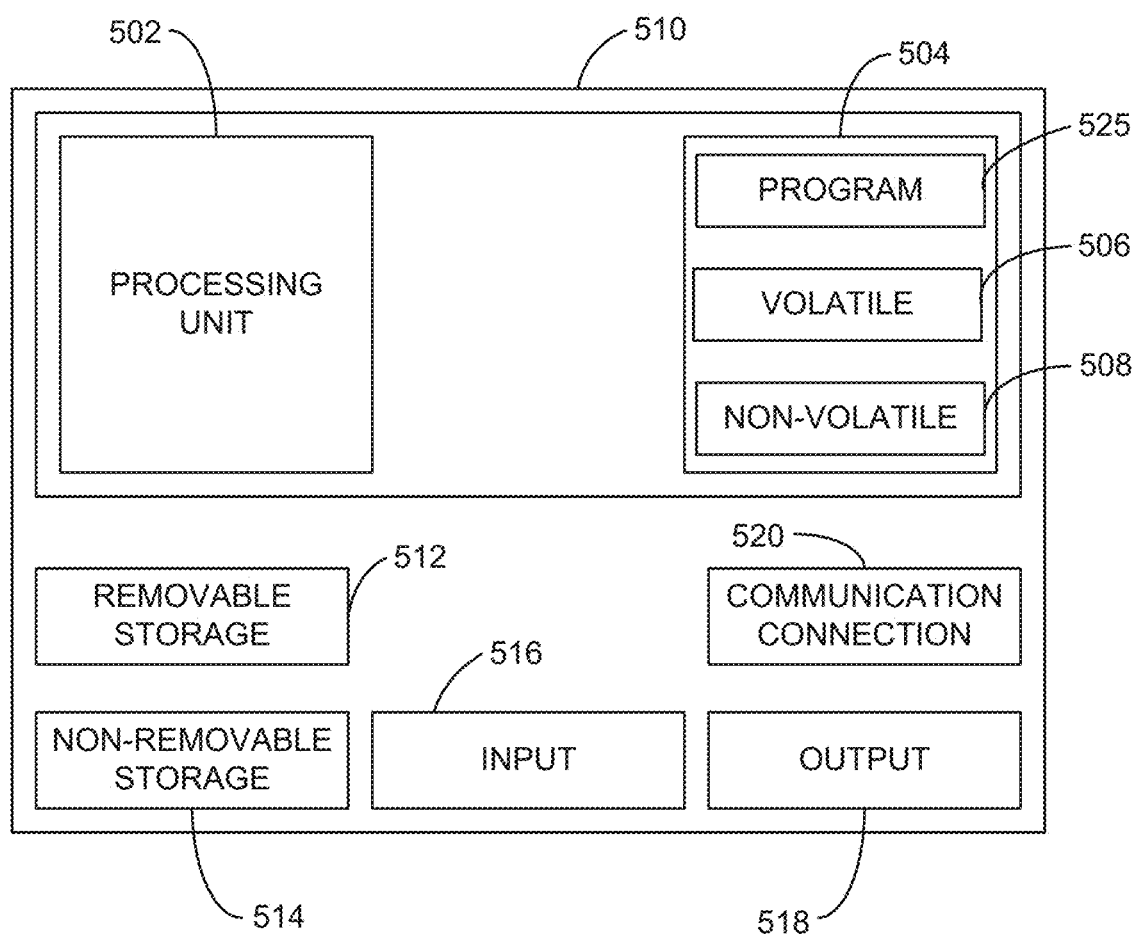
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

Figure 6:
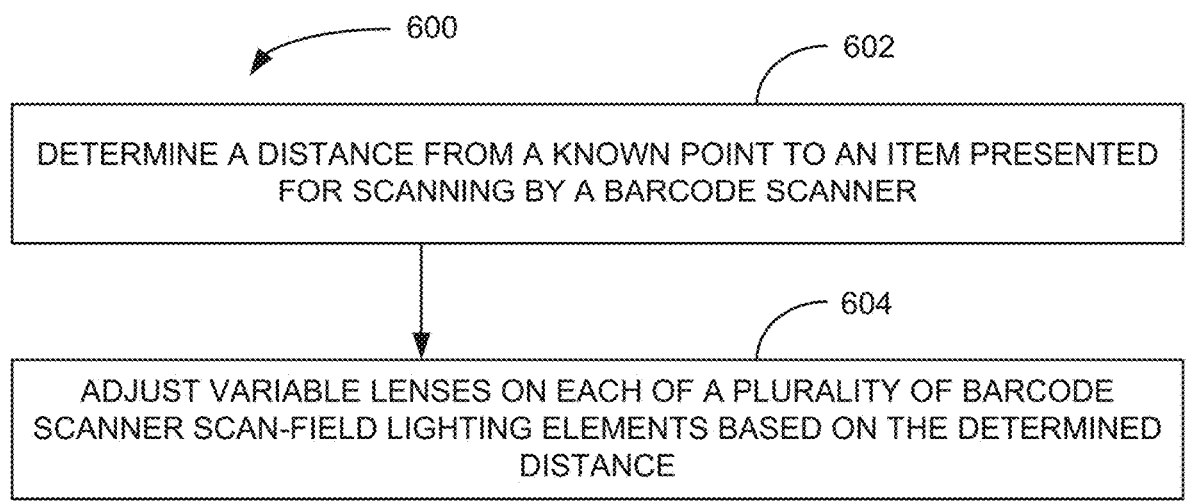
FIG. 6 is a block flow diagram of a method, according to an example embodiment.

FIG. 6 is a block flow diagram of a method 600, according to an example embodiment. The method 600 is an example of a method that may be performed on a scanner 108 of FIG. 1.

The method 600 includes determining 602 a distance from a known point to an item presented for scanning by a barcode scanner adjusting 604 variable lenses on each of a plurality of barcode scanner scan-field lighting elements based on the determined distance. In some embodiments, determining 602 the distance from a known point to an item presented for scanning by the barcode scanner includes measuring a distance from a distance sensor to the item presented for scanning. The distance may be measured in some embodiments by an acoustic/sonar device.

In some further embodiments, the barcode scanner is a bioptic imaging scanner including a first camera under a horizontal surface of the barcode scanner and a second camera behind a vertical surface. In some such embodiments, the barcode scanner includes a horizontal scan field lighting array that illuminates a scan field of the first camera and a vertical scan field lighting array that illuminates a scan field of the second camera. The determining 602 of the distance from a known point to an item presented for scanning by the barcode scanner in some of these embodiments includes approximating a distance from the vertical surface to the item presented for scanning by processing an image captured by the camera under the horizontal surface in view of image locations, each image location calibrated to a known distance. Further, determining 602 the distance from a known point to an item presented for scanning by the barcode scanner may further include approximating a distance from the horizontal surface to the item presented for scanning by processing an image captured by the camera behind the vertical surface in view of image locations, each image location calibrated to a known distance.

The method 600 also typically includes capturing an image with the camera and outputting the image to a barcode reading process of the barcode scanner.

Figure 7:
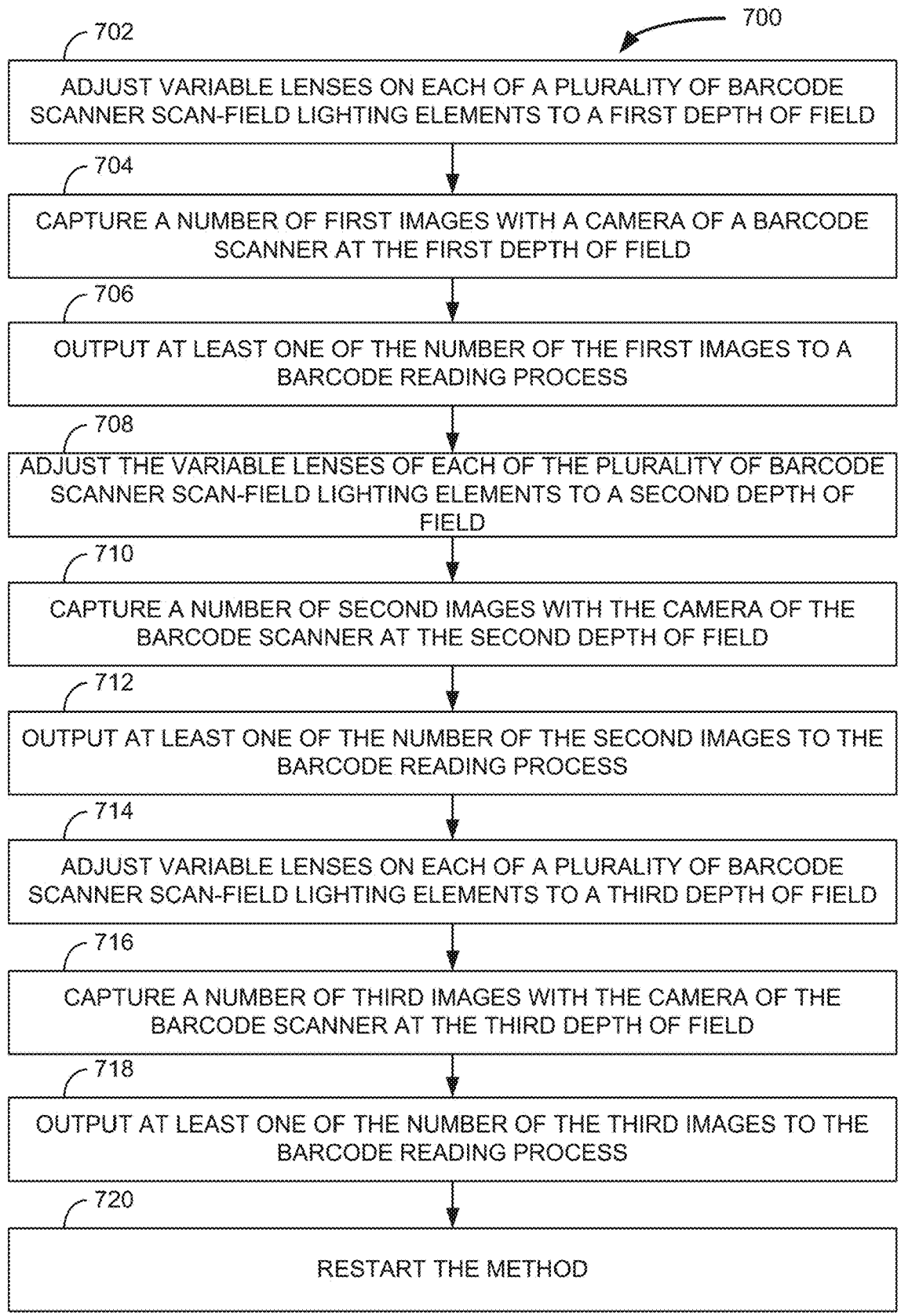
FIG. 7 is a block flow diagram of a method, according to an example embodiment.

FIG. 7 is a block flow diagram of a method 700, according to an example embodiment. The method 700 includes adjusting 702 variable lenses on each of a plurality of barcode scanner scan-field lighting elements to a first depth of field, capturing 704 a number of first images with a camera of a barcode scanner at the first depth of field, and outputting 706 at least one of the number of the first images to a barcode reading process. The method 700 further includes repeating the adjusting 708, 714, capturing 710, 716, and outputting 712, 718 for each additional depth of field of the particular embodiment. Although the method 700 is illustrated and described with regard to three depths of field, other embodiments may include only two depths of field and others may include four or more. The method 700 may then restarts 720 to iterate the process and may continue to do so essentially indefinitely while a device upon which the method 700 is executing is powered on. However, in other embodiments, the method 700 may be started and stopped intermittently when no items are presented for scanning or a terminal or kiosk with which the scanner is deployed is in a sleep mode.

In some embodiments of the method 700, adjusting 702, 708, 714 the variable lenses to each of the first, second, and third depths of field further includes adjusting a variable lens of the camera to the same respective depth of field. The depths of field of the variable lenses may be adjusted 702, 708, 714 in some embodiments by changing voltages of electrical current respectively applied thereto. The voltages applied to the variable lenses to adjust 702, 708, 714 the variable lenses to the first, second, and third depths of field are identified in some embodiments based on data stored in a memory of the barcode scanner. For example, a lookup table may be stored in memory that provides a voltage associated with a certain distance measurement or a fixed-depth of field setting.

In some embodiments, the numbers of first, second, and third images captured are equal. The numbers of first, second, and third images may be set as a configuration setting based on a frame rate of the camera divided by the number of depths of field at which images are captured.

In some embodiments of the method 700, the variable lenses are variable focus lenses. The variable focus lenses in some embodiments are liquid lenses.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    determining a distance from a known point to an item presented for scanning by a barcode; and
    adjusting variable lenses on each lighting element of a plurality of barcode scanner scan-field lighting elements based on the determined distance;
    wherein:
        the barcode scanner is a bioptic imaging scanner including a first camera under a horizontal surface of the barcode scanner and a second camera behind a vertical surface;
        the barcode scanner includes a horizontal scan field lighting array that illuminates a scan field of the first camera and a vertical scan field lighting array that illuminates a scan field of the second camera; and
        determining the distance from a known point to an item presented for scanning by the barcode scanner includes:
            approximating a distance from the vertical surface to the item presented for scanning by processing an image captured by the camera under the horizontal surface in view of image locations, each image location calibrated to a known distance;
            approximating a distance from the horizontal surface to the item presented for scanning by processing an image captured by the camera behind the vertical surface in view of image locations, each image location calibrated to a known distance; and performing the distance determination based on the approximated distances.

2. The method of claim 1, wherein determining the distance from a known point to an item presented for scanning by the barcode scanner includes measuring a distance from a distance sensor to the item presented for scanning.

3. The method of claim 2, wherein the distance sensor is a sonar device.

4. The method of claim 1, further comprising:
capturing an image with the camera; and
outputting the image to a barcode reading process of the barcode scanner.

5. The method of claim 1, wherein the variable lenses are variable focus lenses.

6. The method of claim 5, wherein the variable focus lenses are liquid lenses.

\* \* \* \* \*